Aug. 28, 1951 W. KLOPPMANN 2,565,858
TOBACCO PIPE
Filed March 29, 1947
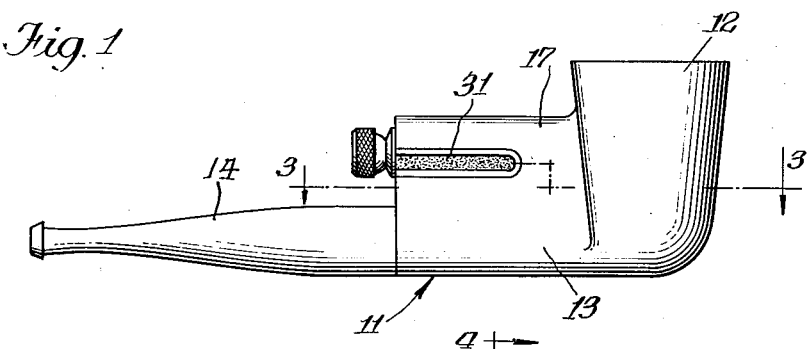
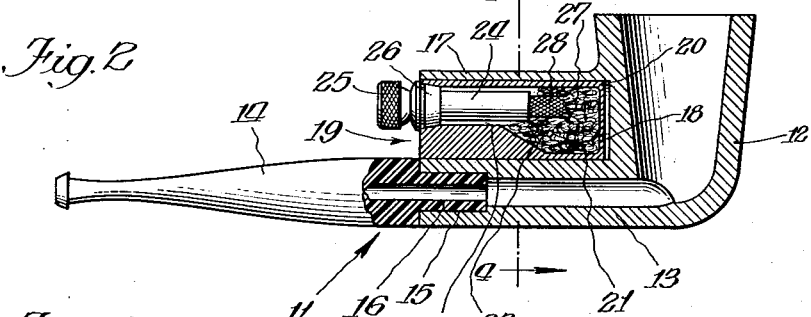
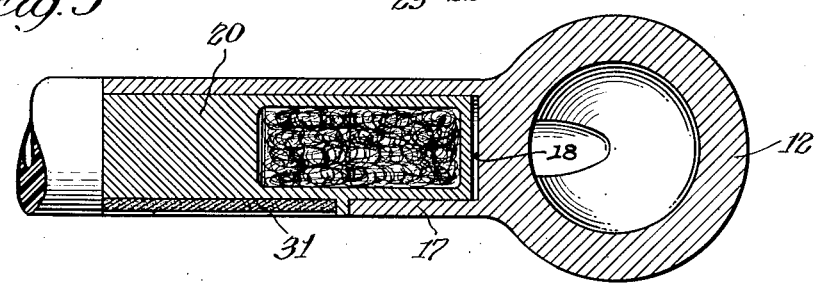
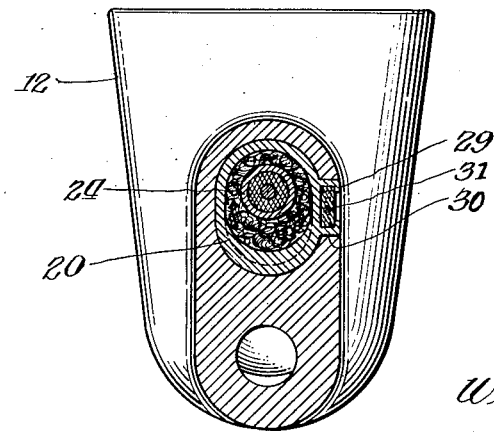
INVENTOR.
Wilbur Kloppmann
BY
Attorneys.

Patented Aug. 28, 1951

2,565,858

UNITED STATES PATENT OFFICE 2,565,858

TOBACCO PIPE

Wilbur Kloppmann, Chicago, Ill.

Application March 29, 1947, Serial No. 738,115

2 Claims. (Cl. 131—185)

The invention relates to tobacco pipes and has as a general object to provide a pipe of new and improved construction affording greater convenience and pleasure to the individual smoking the same.

It is a characteristic of pipes that they go out very readily. If a person smoking a pipe becomes engaged in a conversation of any length whatsoever, or through absorption in some other matter fails to draw on the pipe for any period of time other than a very short period, the pipe is out and the smoker has to re-light the same. Most of the time this re-lighting involves a fumbling around in a search for matches, and frequently the smoker finds that he has already lit his pipe so many times that he has run out of matches.

It is a more particular object of this invention, therefore, to perfect a pipe having a construction adapting the pipe to receive a lighter, thereby making means for lighting the pipe readily available and conveniently operable.

Another object is to perfect a pipe having formed as a part of the bowl portion a housing in which may be received in its entirety a lighter specially designed to fit in the housing.

Still another object is to provide a pipe having a bowl portion formed with a recess open at one end for the insertion of a lighter casing, the recess having a slot formed in one wall thereof and opening through the open end of the recess to permit the insertion therein of a flint carried by the lighter casing.

Other objects and advantages will become apparent from the following detailed description taken in connection with the accompanying drawings, in which:

Fig. 1 is a side elevational view of a pipe illustrating one embodiment of my invention.

Fig. 2 is a vertical sectional view taken substantially through the center line of the pipe of Fig. 1.

Fig. 3 is a fragmetnary horizontal enlarged view taken approximately along the line 3—3 of Fig. 1.

Fig. 4 is a transverse sectional and enlarged view taken along the line 4—4 of Fig. 2.

It is not intended that the invention is to be limited to the specific construction disclosed. On the contrary, it is intended to cover all modifications and alternative constructions falling within the spirit and scope of the invention as defined in the appended claims.

Turning to the invention shown in Figs. 1 to 4, inclusive, 11 generally represents a pipe having a bowl 12, a shank 13 rigid and integral with the bowl 12, and a removable stem or bit 14. The shank 13 and the removable stem 14 have the usual friction fit one within the other. To that end, the end of the shank 13 is provided with a recess 15 and the removable stem 14 is provided with a boss 16 receivable with a friction fit in the recess 15.

In this form of the invention, the pipe is built up over the shank 13 and rearwardly of the bowl 12, this built-up portion 17 being integral with the shank 13 and the bowl 12. Formed in the built-up portion 17 is an elongated recess 18 having its major length extending lengthwise of the pipe and opening through the end of the built-up portion 17 remote from the bowl 12 of the pipe. To facilitate formation of the recess 18 and for other purposes presently to be made known, it is given a generally elliptical transverse cross sectional shape with the major axis of the ellipse extending vertically in the normal position of the pipe.

Received in the recess 18 is a lighter, generally designated 19. The lighter comprises a casing 20 which also is elliptical in transverse cross section so as to conform to that of the recess 18 and be received with a friction fit within the recess. Preferably, the casing has a length no greater than the depth of the recess 18 so that the outer end face of the casing is flush with the end of the built-up portion. As best seen in Fig. 2, the casing has at its inner end an enlarged chamber 21 for the reception of cotton waste, spun glass, or similar material capable of holding by absorption or capillary action a volatile and readily inflammable liquid such as alcohol or the like. The chamber 21 has a front wall portion 22 that slopes gradually upwardly as it progresses outwardly and as a result of which the chamber 21 terminates in a cylindrical passage 23 for the reception of the flame-producing portion of the lighter. This flame-producing portion comprises a cylindrical, pencil-like element 24 readily removable from the casing so that it may be applied to the bowl of the pipe and capable, when removed from the casing, of being ignited. At its outer end the element 24 carries a knurled knob 25 by which it may be grasped. Inwardly of the knob, the element 24 is formed with a frusto-conical collar 26 which cooperates with the slightly beveled end of the passage 23 to form a tight seal. The lighter may be pyrophoric, catalytic or some other type but is herein disclosed, by way of example, as of the flint type. To that end the element 24 at its inner end carries a flint striking pin 27 and a wick 28 saturated with combustible fluid from contact with the packing in the chamber 21.

On one side, herein the right side looking from the stem end of the pipe, the casing 20 of the lighter is formed with a track 29 for the removable reception therein of an elongated piece of flint 30. To accommodate the track 29, the built-up portion 17 has a slot 31 formed therein which opens through the end of a built-up portion away from the bowl 12. Thus, as an incident to the insertion of the casing 20, a holder for a flint, against which the pin 27 may be struck, is automatically provided. In this way, not only is a neat appearance maintained, but the difficult problem of mounting such a flint on the wood of the pipe is solved.

It is believed apparent that I have perfected an improved combination of pipe and lighter in which the lighter is incorporated in the pipe in a unique way. Addition of the lighter does not destroy the neat appearance of the pipe, but on the contrary is believed to enhance the appearance thereof. The lighter, particularly the casing 20 thereof, is, of course, made of light weight metal or possibly plastic in order not to add unduly to the weight of the pipe. In use, the individual smoking the pipe simply grasps the knurled end 25 of the flame-producing element 24, withdraws the element from the casing, strikes it against the flint 30 and applies the same to the tobacco in the bowl of the pipe. When the pipe is lit, the element 24 is returned to the casing 20 where it is immediately and readily available without searching the next time that the individual finds it necessary to light the pipe.

I claim as my invention:

1. In combination, a tobacco pipe having a bowl, a shank, a stem and a built-up portion above said shank and integral with said bowl and shank, said built-up portion having an elongated recess formed therein opening through the end of the portion remote from the bowl and a slot opening laterally through the side of the recess and through the end of said built-up portion, and a lighter of the flint type mounted in the recess and comprising a casing having a chamber for holding combustible fluid, a laterally protruding track on said casing for removably receiving a flint-like element and receivable in the slot in said built-up portion when said casing is received in the recess, and a pencil-like flame-producing element removably receivable in said casing for application of a flame to the tobacco in said pipe including a flint striking pin and a wick.

2. In combination, a tobacco pipe having a bowl, a shank, a stem and a built-up portion above the shank and integral with the shank and the bowl, said built-up portion having an elongated recess formed therein opening through the end of said built-up portion remote from the bowl, the recess in transverse cross section being generally elliptical with the major axis in the plane of the pipe and a slot open at its outer end and opening laterally through the side wall of said built-up portion, and a lighter of the flint type mounted in the recess and comprising an elongated casing generally elliptical in transverse cross section to conform to the transverse shape of the recess and having projecting outwardly from one side wall a flint retaining track, said track being receivable in the slot in said built-up portion when said casing is inserted in the recess, said casing having a chamber at the inner end thereof for holding combustible fluid, a pencil-like flame-producing element removably receivable in said casing for application of a flame to the tobacco in the pipe and including a striking pin and a wick, and a flint removably carried in the track on said casing to provide a striking surface on the outside of said pipe.

WILBUR KLOPPMANN.

REFERENCES CITED

The following references are of record in the file of this patent:

UNITED STATES PATENTS

| Number | Name | Date |
|---|---|---|
| 1,053,039 | Karnes | Feb. 11, 1913 |
| 1,477,122 | Hipple, Jr. | Dec. 11, 1923 |
| 1,551,982 | Doerr | Sept. 1, 1925 |
| 1,845,591 | Eveleth | Feb. 16, 1932 |
| 2,019,382 | Aronson | Oct. 29, 1935 |
| 2,062,486 | Van Dusen, Jr. et al. | Dec. 1, 1936 |

FOREIGN PATENTS

| Number | Country | Date |
|---|---|---|
| 365,733 | Germany | of 1922 |